3,819,745
COATINGS GIVING CONTROLLED RELEASE
Floyd A. Plante, Midland, Mich., assignor to Dow Corning Corporation, Midland, Mich.
No Drawing. Filed Mar. 27, 1972, Ser. No. 238,668
Int. Cl. C08g 47/04, 47/10
U.S. Cl. 260—825    19 Claims

ABSTRACT OF THE DISCLOSURE

A composition consisting essentially of a copolymer composed of $SiO_2$ units and $(CH_3)_3SiO_{1/2}$ units and a block copolymer consisting of an essentially linear portion and an essentially resinous portion has been found useful as a release coating on various substrates especially cellulosic substrates to obtain controlled release values.

---

This application relates to a composition useful as a release coating for adhesives from various substrates. It also relates to a method of treating such substrates to improve the release of adhesives therefrom and to the substrates having a release coating thereon.

More specifically, this invention relates to a composition consisting essentially of about 1 to 25% by weight of a copolymer composed of $SiO_2$ units and $(CH_3)_3SiO_{1/2}$ units in the ratio of 1:0.4 to 1:1.2 and 75 to 99% by weight of a block copolymer consisting essentially of, by weight, 20 to 80% of an essentially linear portion (A) composed of siloxane units selected from the group consisting of $(CH_3)_2SiO$, $R(CH_3)SiO$ and $R'SiO_{3/2}$ units wherein R and R' are selected from the group consisting of monovalent hydrocarbon and monovalent halogenated hydrocarbon radicals containing from 1–18 carbon atoms, said $R'SiO_{3/2}$ units constituting no more than 50 mole percent of all the siloxane units in (A), said linear portion (A) having a degree of polymerization in the range of 3 to 6000, and the ratio of organo groups to silicon atoms in (A) being in the range of 1.5 to 2.0:1, and 20 to 80% of an essentially resinous portion (B) composed of siloxane units selected from the group consisting of $R''(CH_3)SiO$ and $R'''SiO_{3/2}$ units wherein $R''$ and $R'''$ are selected from the group consisting of monovalent hydrocarbon and monovalent halogenated hydrocarbon radicals containing from 1–18 carbon atoms, said $R''(CH_3)SiO$ units constituting no more than 40 mole percent of all the siloxane units in (B) nor no more than 50 weight percent of all the siloxane units in (B), and the ratio of organo groups to silicon atoms in (B) being in the range of 1 to 1.4:1, said block copolymer containing residual functional groups.

This invention also relates to a method of treating a solid substrate to improve the release of adhesive materials therefrom, said method comprising applying to the substrate the composition as defined above and after said composition has been applied to the substrate, curing said composition.

This invention further relates to a substrate having a release coating thereon which constitutes the cured composition defined above.

While many substances including several silicone compositions have been used as release agents heretofore, there are still many problems encountered in their use. For example, some release coatings give too high a release value whereas others give too low release values. Other release coatings give release values which "drift" or change with time while still other release coatings tend to "block" or stick together under pressure.

It has been found that the composition and process of this invention results in substrates which have a release coating thereon which can be controlled to give the desired release values depending upon the particular adhesive and circumstances encountered. That is to say, it has been found that by varying the ratio of the two components of the present invention it is now possible to tailor-make a release composition to give release values in whatever range desired. Generally speaking these release values will fall within the broad range of about 50 to 500 grams per inch as measured by Routine Control Test No. 283 of the Technical Association for the Pulp and Paper Industry which is commonly called the "Keil Test." This test is well known to those skilled in the art and is described in Tappi, volume 43, No. 8, pages 164A–165A, August 1960. It has also been found that the release coatings of this invention are subject ot a minimal amount of drifting of the release values, and with the proper selection of curing catalysts, the blocking problems frequently encountered with other release coatings can be substantially lessened if not eliminated. Further, substrates coated with a composition of this invention have been found to be relatively free from photosensitizing.

The first component of the composition is a copolymer composed of $SiO_2$ units and $(CH_3)SiO_{1/2}$ units. These copolymers are well known materials to those skilled in the silicone art. They can be prepared by the cohydrolysis of $(CH_3)_3SiX$ and $SiX_4$ wherein X is a hydrolyzable radical such as a halogen (chlorine, fluorine, bromine) or any alkoxy (methoxy, ethoxy, propoxy, butoxy, etc.) radical, employing of course, such proportions as necessary to obtain the desired $SiO_2$ to $(CH_3)_3SiO_{1/2}$ ratio of 1:0.4 to 1:1.2. Alternatively, a copolymer can be prepared, for example, by reacting $(CH_3)_3SiCl$, $(CH_3)_3SiOC_2H_5$ or $(CH_3)_3SiOSi(CH_3)_3$ with an acidic silica sol. Such a method is fully described in U.S. Pat. 2,676,182, the entire disclosure of said patent being incorporated herein by reference. These copolymers can be used as prepared or they can be further treated prior to use to reduce the silanol content as by bodying with a base such as potassium hydroxide or by reacting with hexamethyldisiloxane, trimethylchlorosilane or hexamethyldisilazane. As noted heretofore there are numerous references to the preparation of these copolymers in the literature and some of these materials are commercially available. It should be noted at this point that while the copolymer is defined as being composed of two basic units, this is not intended to preclude the presence of small amounts (say less than 5 mole percent) of other siloxane units such as dimethylsiloxane or monomethylsiloxane units in insignificant quantities. This copolymer constitutes from 1 to 25% by weight of the composition used as a release coating herein. As the amount of this component reaches the 25% level the release values achieved with the compositions of this invention tend to level off, and with increasing amounts of this component beyond the 25% level the physical properties of the release coatings tend to deteriorate.

The block copolymers useful in the present invention which constitutes the second component of the release composition are also known materials, some of them also being commercially available. Attention with respect to these materials is directed to U.S. Pats. 3,294,718; 3,308,203; and 3,328,481 for a detailed description of these materials and methods for their preparation. The entire disclosures of the aforementioned patents are incorporated herein by reference. Basically, the block copolymers are prepared by reacting an essentially linear siloxane which contains functional groups such as hydroxyl or alkoxy groups in the endblocking position with an essentially resinous siloxane containing functional groups such as hydroxyl or acyloxy groups in the presence of a suitable catalyst, which catalyst causes the condensation of the linear and resinous materials via the functional groups. It is believed that the functional groups of the linear material are consumed in the condensation reaction and that there remains some residual functional groups from the resinous material in the block copolymer product. When the block copolymer is applied to a substrate and cured using well known catalysts the curing takes place by means of the condensation of the residual functional groups (regardless of their origins) with each other and/or condensation with any similar functional groups which may be present on the substrate.

In the block copolymers the radicals R, R', R'' and R''' are each independently selected from the group consisting of monovalent hydrocarbon and monovalent halogenated hydrocarbon radicals. Thus, these radicals can be alkyl, alkenyl, cycloalkyl, cycloalkenyl, aryl, alkaryl, aralkyl, or the corresponding halogenated radicals. Specific examples of these radicals are the methyl, ethyl, propyl, butyl, amyl, hexyl, octyl, decyl, dodecyl, octadecyl, vinyl, allyl, hexenyl, dodecenyl, cyclohexyl, cyclohexenyl, phenyl, naphthyl, xenyl, tolyl, xylyl, mesityl, benzyl, phenethyl chloromethyl, 3,3,3-trifluoropropyl, bromobutyl, chlorovinyl, dichlorophenyl, hexafluorophenyl, chloroxenyl, bromoxenyl and alpha,alpha,alpha-trifluorotolyl radicals. While these radicals can contain from 1–18 carbon atoms it is preferred that they contain from 1–6 carbon atoms, with the methyl, ethyl, propyl, vinyl and phenyl species being the preferred embodiments.

In the essentially linear portion of the block copolymer which is designated (A) the degree of substitution or ratio of organo groups to silicon atoms is in the range of 1.5 to 2:1 with a range of 1.9 to 2:1 being preferred. The degree of polymerization which is the average number of siloxane units present can range from 3 to 6000 with a range of 25 to 500 being preferred at this time. While the (A) portion can be composed of $(CH_3)_2SiO$, $R(CH_3)SiO$ and $R'SiO_{3/2}$ units, the $R'SiO_{3/2}$ units cannot consitute more than 50 mole percent of all the siloxane units in (A). Stated somewhat differently, (A) can be composed of $(CH_3)_2SiO$ units only, $R(CH_3)SiO$ units only, $(CH_3)_2SiO$ and $R'SiO_{3/2}$ units, $R(CH_3)SiO$ and $R'SiO_{3/2}$ units, $(CH_3)_2SiO$ and $R(CH_3)SiO$ units, or $(CH_3)_2SiO$, $R(CH_3)SiO$ and $R'SiO_{3/2}$ units, subject of course to the other limitations heretofore mentioned. While the (A) portion can constitute from 20 to 80% by weight of the block copolymer best results are believed to be obtained when it makes up to 50 to 75% of the block copolymer.

In the essentially resinous portion of the block copolymer which is designated (B), the degree of substitution or ratio of organo groups to silicon atoms is in the range of 1 to 1.4:1 with a range of 1 to 1.1:1 being preferred. In the (B) portion of the copolymer the $R''(CH_3)SiO$ units can constitute no more than 40 mole percent of all the siloxane units in (B) nor more than 50 weight percent of all the siloxane units in (B). Thus, the (B) portion can be composed of $R'''SiO_{3/2}$ units only or $$R''(CH_3)SiO$$

and $R'''SiO_{3/2}$ units subject to the limitations noted above. While (B) can be 20 to 80% by weight of the block copolymer it preferably is 25 to 50% for best results.

As noted above the block copolymer contains residual functional groups such as hydroxyl (silanol), alkoxy (methoxy, ethoxy, propoxy, hexyloxy), acyloxy (acetoxy, propionoxy, hexanoxy) and oxime $$\{-N=C(C_2H_5)(CH_3)\}$$

groups which condense when the copolymer is cured on the substrate. The particular functional group(s) present are believed to depend on what was used to make the resinous portion (B). At this time the preferred functional group is the silanol.

Any of the well known condensation catalysts can be employed for curing the compositions of this invention. Examples of such catalysts are primary, secondary and tertiary amines preferably with disassociation constants of at least $10^{-10}$; condensation products of an aliphatic aldehyde with a primary amine; carboxylic acid salts of metals higher than hydrogen in the electromotive series; titanate esters; and alkali metal phenoxides. Specific examples of such catalysts are set forth in column 3, lines 19–54 of U.S. Pat. 3,527,659, the disclosure which is incorporated herein by reference for the benefit of those unfamiliar in this art. A particular useful curing catalyst for the block copolymers of this invention is a quaternary ammonium salt such as benzyltrimethyl ammonium acetate, tetraheptyl ammonium acetate, and trimethyl betahydroxyethyl ammonium 2-ethylhexoate. When this latter type of catalyst is used, particularly in conjunction with a silanol containing copolymer, it has been found that blocking problems can be substantially reduced if not eliminated. The latter quaternary ammonium catalyst mentioned above is particularly preferred. The amount of catalyst employed can vary and need only be enough to cause curing of the composition. Generally speaking, an amount in the range of 0.1 to 5% by weight based on the weight of the composition will be used.

The composition of this invention can be applied to the substrate by any convenient or well known means and the method chosen will depend on the nature and shape of the substrate as well as individual preferences and available equipment. Thus, the composition can be applied by dipping, brushing, spraying, knife or air blade coaters, rollers and other such well known techniques. When the composition is a liquid it can be applied neat, but when it is a very viscous liquid or solid it is best applied from a suitable solvent such as toluene, xylene, hexane, heptane or naphtha. It can also be applied from aqueous emulsion where other solvents are not desirable. The concentration of the composition in the solvent is not critical and depends solely on the amount one wishes to deposit on the substrate and ease of handling. Thus the concentration of the composition in the solvent can vary from 1 to 50% by weight.

After the composition is applied to the substrate it is cured. Curing can be accomplished by air drying but this is generally too slow for most commercial applications. Therefore, it is preferred to heat the coating for a short time, say 30 seconds to 10 minutes, at a temperature in the range of 200° to 400° F. (93–204° C.). The actual time and temperature employed will depend on that needed to cure the composition and the substrate involved.

So far as is known at present, the composition of this invention can be applied to any solid substrate on which it is desired to have a release coating. By way of illustration the substrate can be siliceous, such as glass, stone, or ceramic; plastic; rubber; metal; cellulosic, such as wood, cotton or paper; and fabrics. This invention is particularly applicable to all types of paper substrates such as glassine, parchment, kraft, tissue and the like. Now in order that those skilled in the art may better understand how the present invention can be practiced, the following examples are given by way of illustration and not by way of limitation. All parts and percents referred to herein are by weight and all viscosities measured at 25° C. unless otherwise specified. All release values were measured using the Keil Test and pulling at a speed of 12 inches per minute unless otherwise specified. It is noted for those not skilled in the art that the use of the different adhesives and different stripping speeds will yield different release values in this test.

EXAMPLE 1

Four release compositions were prepared by mixing (1) 10 g. of a solvent solution of a block copolymer consisting essentially of 28 parts toluene, 42 parts heptane and 30 parts of a block copolymer consisting essentially of (1) 60% of an essentially linear portion composed of $(CH_3)_2SiO$ units and 40% of an essentially resinous portion composed of about 10 mole percent $$C_6H_5(CH_3)SiO$$

units and about 90 mole percent $C_6H_5SiO_{3/2}$ units, (2) varying amounts of a 10% (solids) xylene solution of a copolymer composed of $SiO_2$ units and $(CH_3)_3SiO_{1/2}$ units in the ratio of 1:0.4 to 1:1.2, and (3) 0.05 g. of catalyst solution composed of 80 parts n-butanol and 20 parts trimethyl betahydroxyethyl ammonium 2-ethylhexoate. These compositions designated A, B, C and D contained 0.15 g., 0.30 g., 0.45 g. and 0.60 g. of copolymer solution (2) respectively.

The above compositions were coated at about 30% solids on a 40 lb. Weyerhaeuser supercalendered (S2S) kraft paper using a No. 6 Mayer rod. The coating was then cured for 30 seconds at 325° F. The papers were checked immediately for release and then aged at ambient room temperature conditions and relase tested periodically. Test results are set forth in Table I.

TABLE I

| Composition | Release (g./in.) | | | |
|---|---|---|---|---|
| | Initial | 1 week | 2 weeks | 4 weeks |
| A[1] | 38 | 43 | 38 | 33 |
| B | 62 | 58 | 52 | 47 |
| C | 85 | 77 | 70 | 60 |
| D | 112 | 98 | 90 | 108 |

[1] Included for comparison

EXAMPLE 2

Four release compositions were prepared. Composition A consisted essentially of 8.33 g. of solution (1) of Example 1, 16.6 g. of heptane and 0.05 g. of the catalyst solution (3) of Example 1. Composition B consisted essentially of 6.25 g. of solution (1) of Example 1, 6.25 g. of solution (2) of Example 1, 12.45 g. of heptane, and 0.05 g. of solution (3) of Example 1. Composition C consisted essentially of 4.17 g. of solution (1) of Example 1, 12.50 g. of solution (2) of Example 1, 8.28 g. of heptane, and 0.05 g. of solution (3) of Example 1. Composition D consisted essentially of 2.08 g. of solution (1) of Example 1, 18.74 g. of solution (2) of Example 1, 4.13 g. of heptane, and 0.05 g. of solution (3) of Example 1.

The above compositions were coated at 10% solids on a 40 lb. Weyerhaeuser supercalendared (S2S) kraft paper using a No. 6 Mayer rod. The coating was then cured for 30 seconds at 325° F. Release values were tested as in Example 1 and the results are set forth in Table II.

TABLE II

| Composition | Release (g./in.) | | | |
|---|---|---|---|---|
| | Initial | 1 week | 2 weeks | 4 weeks |
| A[1] | 37 | 37 | 32 | 33 |
| B | 170 | 162 | 165 | 168 |
| C[1][2] | 248 | 247 | 237 | 240 |
| D[1][2] | 395 | 412 | 365 | 397 |

[1] Included for comparison.
[2] Coating was crumbly and exhibited rub-off.

EXAMPLE 3

Five release compositions were prepared. Composition A consisted essentially of (1) 33.3 g. of a solvent solution of a block copolymer consisting essentially of 210 parts of petroleum naphtha (Tolusol 40) and 30 parts of a block copolymer consisting essentially of 60% of an essentially linear portion composed of $(CH_3)_2SiO$ units and 40% of an essentially resinous portion composed of about 10 mole percent $C_6H_5(CH_3)SiO$ units and about 90 mole percent $C_6H_5SiO_{3/2}$ units, (2) 16.55 g. of petroleum naphtha, and (3) 0.15 g. of catalyst solution composed of 80 parts n-butanol and 20 parts trimethyl beta-hydroxyethyl ammonium 2-ethylhexoate. Composition B consisted essentially of 30 g. of (1) above, 9.85 g. of (2) above, 0.15 g. of (3) above, and (4) 10 g. of a 10% (solids) xylene solution of a copolymer composed of $SiO_2$ units and $(CH_3)_3SiO_{1/2}$ units in the ratio of 1:0.4 to 1:1.2. Composition C consisted essentially of 26.7 g. of (1) above, 3.15 g. of (2) above, 0.15 g. of (3) above, and 20 g. of (4) above. Composition D consisted essentially of 25 g. of (1) above, 0.15 g. of (3) above, and 25 g. of (4) above. Composition E consisted essentially of (1) 4.17 g. of a solvent solution of a polymer consisting essentially of 67 parts xylene, 1 part siloxane composed of $H(CH_3)SiO$ units, and 32 parts siloxane composed of $(CH_3)_2SiO$ units, (2) 20.75 g. petroleum naphtha, and (3) 0.08 g. of catalyst solution composed of 50% xylene and 50% dibutyl-tin-di-2-ethylhexoate.

Compositions A thru D were coated at 20% solids on a 40 lb. Weyerhaeuser supercalendarde (S2S) kraft paper using a No. 6 Mayer rod, while Composition E was coated at 5% solids on the same kind of paper using a No. 14 Mayer rod. All papers were cured 30 seconds at 325° F. After being coated, release values of papers coated with compositions A thru D were determined as in Example 1 and the test results are set forth in Table III. Release values of paper coated with Composition E (a commercially available release agent) were not measured at this time but are known to be in the 10 to 20 g./in. range.

TABLE III

| Composition | Release (g./in.) | | | |
|---|---|---|---|---|
| | Initial | 4 days | 9 days | 15 days |
| A[1] | 38 | 37 | 32 | 32 |
| B | 225 | 232 | 192 | 208 |
| C | 228 | 232 | 207 | 205 |
| D | 232 | 222 | 137 | 212 |

[1] Included for comparison.

To test the stability of the coating composition against migration, samples of the above prepared papers were placed face to face (that is, coated sides together) and aged for varying lengths of time at 158° F. under ¼ pound per square inch of pressure. Migration has been a particular problem heretofore when a high release coating was in contact with a low release coating. The release values were then determined as in Example 1. The laminate combinations and the test results are set forth in Table IV.

TABLE IV

| Laminate combination | Release (g./in.) | | | |
|---|---|---|---|---|
| | Initial | 4 days | 9 days | 15 days |
| A/E[1] | 38/18 | 32/13 | 37/15 | 35/10 |
| B/E | 225/18 | 213/15 | 213/15 | 255/13 |
| C/E | 228/18 | 217/15 | 222/15 | 268/12 |
| D/E | 232/18 | 208/15 | 230/15 | 245/15 |
| A/D | 38/232 | 42/225 | 35/212 | 37/210 |

[1] Included for comparison.

EXAMPLE 4

Six release compositions were prepared. Composition A consisted essentially of 16.66 g. of a solvent solution of a polymer consisting essentially of 67 parts xylene, 1 part siloxane composed of $H(CH_3)SiO$ units, and 32 parts siloxane composed of $(CH_3)_2SiO$ units, 82.85 g. of petroleum naphtha, and 0.49 g. of catalyst solution composed of 50% xylene and 50% dibutyl-tin-di-2-ethylhexoate. Composition B consisted essentially of (1) 12.50 g. of a block copolymer consisting essentially of 60% of an essentially linear portion composed of $(CH_3)_2SiO$ units and 40% of an essentially resinous portion composed of about 10 mole percent $C_6H_5(CH_3)SiO$ units and about 90 mole percent $C_6H_5SiO_{3/2}$ units, (2) 37.42 g. of petroleum naphtha, and (3) 0.08 g. of catalyst solution composed of 80 parts n-butanol and 20 parts trimethyl betahydroxyethyl ammonium 2-ethylhexoate. Composition C consisted essentially of 12.50 g. of (1) above, 37 g. of (2) above, 0.08 g. of (3) above, and (4) 0.42 g. of a 60% (solids) xylene solution of a copolymer composed of $SiO_2$ and $(CH_3)_3SiO_{1/2}$ units in the ratio of 1:0.4 to 1:1.2. Composition D consisted essentially of 12.50 g. of (1) above, 36.59 g. of (2) above, 0.08 g. of (3) above, and 0.83 g. of (4) above. Composition E consisted essentially of 12.50 g. of (1) above, 36.17 g. of (2) above, 0.08 g. of (3) above, and 1.25 g. of (4) above. Composition F consisted essentially of 12.50 g. of (1) above, 35.76 g. of (2) above, 0.08 g. of (3) above, and 1.66 g. of (4) above.

Composition A was coated at 5% solids on a 40 lb. Weyerhaeuser supercalendared (S2S) kraft paper using a No. 14 Mayer rod, while compositions B thru F were coated on the same kind of paper at 10% solids using a No. 10 Mayer rod. All paper were cured for 30 seconds at 325° F.

To test the stability against migration of the release coatings on the papers as prepared above, samples of these paper were placed face to face (i.e., coated sides in contact) and aged for varying lengths of time at 158° F. under ¼ pound per square inch of pressure. The release values were then determined as in Example 1. The laminate combinations and the test results are set forth in Table V.

TABLE V

| Laminate combination | Release (g./in.) | | | | |
|---|---|---|---|---|---|
| | Initial | 3 days | 9 days | 14 days | 21 days |
| B/A [1] | 48/15 | 37/12 | 33/10 | 32/12 | 30/12 |
| C/A | 160/15 | 170/13 | 210/12 | 207/10 | 200/12 |
| D/A | 232/15 | 250/23 | 248/13 | 280/13 | 280/12 |
| E/A | 253/15 | 275/15 | 272/13 | 253/12 | 300/13 |
| F/A | 265/15 | 253/13 | 290/15 | 277/13 | 312/15 |
| B/F | 48/265 | 30/223 | 22/205 | 35/253 | 38/235 |

[1] Included for comparison.

units and about 90 mole percent $C_6H_5SiO_{3/2}$ units, and 60 parts toluene. Compositions II and II' consisted essentially of 30.8 parts of the above block copolymer, 15.4 parts of a 60% (solids) xylene solution of a copolymer composed of $SiO_2$ and $(CH_3)_2SiO_{1/2}$ units in the ratio of 1:0.4 to 1:1.2, and 53.8 parts of toluene.

Seven release compositions designated A thru G were prepared from the above compositions. All seven contained 742.5 g. of heptane and 7.5 g. of catalyst solution composed of 80 parts n-butanol and 20 parts trimethyl betahydroxyethyl ammonium 2-ethylhexoate. In addition to the foregoing components, Composition A contained 250 g. of I, Composition B contained 175 g. of I and 75 g. of II, Composition C contained 75 g. of I and 175 g. of II, Composition D contained 250 g. of II, Composition E contained 250 g. of I', Composition F contained 75 g. of I' and 175 g. of II', and Composition G contained 250 g. of II'.

The above prepared release compositions were coated on 40 lb. Weyerhaeuser supercalendared (S2S) kraft and 78 lb. Mando clay coated kraft papers using a pilot coater equipped with a 45Q gravure roll. The coated paper was cured for 30 seconds at various temperatures. Also, in the case of Composition C, the release composition was aged 4 hours at room temperature before applying it to the paper.

The papers were checked immediately after coming off the coated for appearance and quality of the cured coating. Rub-off and smear are subjective tests used in the industry. They are determined by rubbing a finger tip across the coating to see if it crumbles or is removed (rub-off) or if it is uncured (smears). Migration is also a subjective test used in the industry and is conducted by placing a piece of Scotch brand cellophane tape on the coating, removing the tape, and seeing if it will then stick to itself. If it sticks no migration has taken place. If it does not stick the release coating has migrated to the adhesive. These evaluations are set forth in Table VI where the symbol "S" means slight, "VS" means very slight, and "SH" means slight haze. Also set forth in Table VI are the release values of the papers which were determined as in Example 1.

TABLE VI

| Composition | Cure temperature (° F.) | Substrate | Appearance | | | (Release (g./in.)) | | | |
|---|---|---|---|---|---|---|---|---|---|
| | | | Rub-off | Smear | Migration | Initial | 1 week | 2 weeks | 4 weeks |
| A [1] | 350 | Weyerhaeuser | VS | NO | NO | 42 | 61 | 41 | 38 |
| B | 350 | do | VS | NO | VS | 119 | 110 | 99 | 101 |
| C | 350 | do | VS | NO | NO | 198 | 182 | 162 | 160 |
| C | 250 | do | S | NO | VS | 205 | [3] 110 | [3] 129 | [3] 123 |
| C | 200 | do | YES | SH | S | 204 | [3] 30 | [3] 43 | [3] 38 |
| C [2] | 350 | do | VS | NO | NO | 195 | 155 | 146 | 155 |
| D | 350 | do | VS | NO | NO | 238 | 216 | 200 | 192 |
| E [1] | 350 | do | NO | SH | VS | 25 | 31 | 38 | 36 |
| F | 350 | do | NO | NO | NO | 287 | 236 | 256 | 248 |
| G | 350 | do | NO | NO | NO | 353 | 261 | 296 | 266 |
| A [1] | 350 | Mando | NO | NO | VS | 50 | 48 | 50 | 54 |
| C | 350 | do | VS | NO | VS | 181 | 172 | 163 | 168 |
| D | 350 | do | VS | NO | VS | 226 | 209 | 200 | 198 |

[1] Included for comparison.
[2] Four hour bath age.
[3] Detackification of test tape.

EXAMPLE 5

Two lots of two release compositions were prepared. Compositions I and I' consisted essentially of 40 parts of a silanol function block copolymer consisting essentially of 60% of an essentially linear portion composed of $(CH_3)_2SiO$ units and 40% of an essentially resinous portion composed of about 10 mole percent $$C_6H_5(CH_3)SiO$$

To further test the release qualities of the above prepared papers, laminates were formed with 60 lb. matte litho paper and an adhesive. The litho paper had about a one mil dry thickness of adhesive on it which was formed by casting the adhesive on the paper and drying it for one minute at 150° F. After the laminates were prepared they were aged at 158° F. and under no pressure for various lengths of time. The release values were then measured as in Example 1 and the results set forth in Table VII.

TABLE VII

| Composition | Cure temperature (° F.) | Substrate | Release (g./in.) | | | | | | | |
|---|---|---|---|---|---|---|---|---|---|---|
| | | | Styrene-butadiene rubber [3] | | | | Styrene-butadiene rubber [4] | | | |
| | | | Initial | 1 week | 2 weeks | 4 weeks | Initial | 1 week | 2 weeks | 4 weeks |
| A [1] | 350 | Weyerhaeuser | 5 | 9 | 14 | 26 | 407 | 550 | 651 | 574 |
| B | 350 | do | 11 | 21 | 42 | 33 | 570 | 1,050 | 930 | 736 |
| C | 350 | do | 21 | 55 | 90 | 90 | 611 | 1,280 | 1,070 | 821 |
| C | 200 | do | 62 | 130 | 167 | 163 | 919 | 1,400 | TORE | TORE |
| C [2] | 350 | do | 25 | 69 | 105 | 78 | 652 | 1,280 | TORE | TORE |
| D | 350 | do | 20 | 64 | 87 | 72 | | | | |
| E [1] | 350 | do | 8 | 9 | 14 | 22 | 319 | 550 | 592 | 608 |
| F | 350 | do | 43 | 99 | 116 | 104 | 785 | 1,300 | TORE | 970 |
| G | 350 | do | 68 | 133 | 169 | 152 | 776 | 1,400 | TORE | TORE |
| A [1] | 350 | Mando | 8 | 9 | 13 | 20 | 500 | 600 | 942 | 766 |
| C | 350 | do | 37 | 36 | 71 | 38 | TORE | TORE | TORE | TORE |
| D | 350 | do | 55 | 49 | 83 | 48 | TORE | TORE | TORE | TORE |

[1] Included for comparison.
[2] Four hour bath age.
[3] Compac Corp.
[4] National Starch Co.

EXAMPLE 6

A release composition was prepared which consisted essentially of (1) 0.85 g. of a solvent solution of a block copolymer consisting essentially of 65.4 parts toluene, 23.1 parts of a block copolymer consisting essentially of 60% of an essentially linear portion composed of $(CH_3)_2SiO$ units and 40% of an essentially resinous portion composed of about 10 mole percent $C_6H_5(CH_3)SiO$ units and about 90 mole percent $C_6H_5SiO_{3/2}$ units, and 11.5 parts of a 60% (solids) xylene solution of a copolymer composed of $SiO_2$ units and $(CH_3)_3SiO_{1/2}$ units in the ratio of 1:0.4 to 1:1.2, (2) 0.10 g. of a composition consisting essentially of 50.2% toluene, 3.5%

$$HOCH_2CH_2N(CH_3)_2$$

and 46.3% of

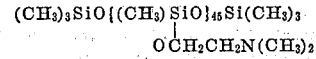

(3) 1 g. of methyl ethyl ketone, (4) 23 g. of heptane, and (5) 0.05 g. of catalyst solution composed of 80 parts n-butanol and 20 parts trimethyl betahydroxyethyl ammonium 2-ethylhexoate.

The above composition was coated onto a polyethylene terephthalate resin (polyester) film using a No. 4 Mayer rod and cured for 45 seconds at room temperature followed by 15 seconds at 300° F. The release value of the coating was determined as in Example 1 and found to be .982 g./in.

EXAMPLE 7

Coating compositions giving controlled release can be prepared from 1 to 25% of a copolymer composed of $SiO_2$ units and $(CH_3)_3SiO_{1/2}$ units in the ratio of 1:0.4 to 1:1.2 and 75 to 99% of a block copolymer containing the linear portions (A) and resinous portions (B) as set forth below.

(1) 80% (A) composed of $(CH_3)_2SiO$ units.
    20% (B) composed of $C_6H_5SiO_{3/2}$ units.
(2) 60% (A) composed of about 75 mole percent $(CH_3)_2SiO$ units and about 25 mole percent $C_2H_5(CH_3)SiO$ units.
    40% (B) composed of about 10 mole percent $C_2H_5(CH_3)SiO$ units and about 90 mole percent $C_6H_5SiO_{3/2}$ units.
(3) 75% (A) composed of about 50 mole percent $(CH_3)_2SiO$ units and about 50 mole percent $CF_3CH_2CH_2(CH_3)SiO$ units.
    25% (B) composed of about 90 mole percent $CH_3SiO_{3/2}$ units and about 10 mole percent $C_6H_5SiO_{3/2}$ units.
(4) 50% (A) composed of about 95 mole percent $(CH_3)_2SiO$ units and about 5 mole percent $C_{18}H_{37}SiO_{3/2}$ units.
    50% (B) composed of about 10 mole percent $C_{18}H_{37}(CH_3)SiO$ units and about 90 mole percent $C_6H_5SiO_{3/2}$ units.
(5) 60% (A) composed of about 90 mole percent $C_2H_5(CH_3)SiO$ units and about 10 mole percent $CH_2=CHSiO_{3/2}$ units.
    40% (B) composed of about 10 mole percent $C_2H_5(CH_3)SiO$ units and about 90 mole percent $C_6H_5SiO_{3/2}$ units.
(6) 52.1% (A) composed of about 94.2 mole percent $(CH_3)_2SiO$ units and about 5.8 mole percent $C_6H_5SiO_{3/2}$ units.
    47.9% (B) composed of about 10 mole percent $C_6H_5(CH_3)SiO$ units and about 90 mole percent $C_6H_5SiO_{3/2}$ units.
(7) 40% (A) composed of about 97.1 mole percent $(CH_3)_2SiO$ units and about 2.9 mole percent $CH_3SiO_{3/2}$ units.
    60% (B) composed of about 70 mole percent $C_6H_5SiO_{3/2}$ units and about 30 mole percent $C_3H_7SiO_{3/2}$ units.
(8) 40% (A) composed of about 97.1 mole percent $(CH_3)_2SiO$ units and about 2.9 mole percent $CH_3SiO_{3/2}$ units.
    60% (B) composed of about 10 mole percent $C_6H_5(CH_3)SiO$ units and about 90 mole percent $C_6H_5SiO_{3/2}$ units.
(9) 60% (A) composed of about 97 mole percent $(CH_3)_2SiO$ units and about 3 mole percent $CH_3SiO_{3/2}$ units.
    40% (B) composed of about 20 mole percent $(CH_3)_2SiO$ units, about 20 mole percent $$(C_6H_5)_2SiO$$

units, about 35 mole percent $C_6H_5SiO_{3/2}$ units, and about 25 mole percent $CH_3SiO_{3/2}$ units.

EXAMPLE 8

When the compositions of this invention as described in the preceding examples are sprayed or brushed onto glassine or parchment papers, aluminum foil, polypropylene films, or Mylar (polyethylene terephthalate resin) polyester films, and cured thereon as described heretofore, substrates having good release coatings thereon are obtained.

EXAMPLE 9

The use of plastics laminated to wood as tops for desks and tables or as wall paneling surfaces is well known. For example, thin sheets of urea-formaldehyde or phenol-formaldehyde resins absorbed in a fibrous base (Formica) are prepared and then laminated to wood under pressure. A paper having a release coating thereon is employed to insure release of the laminate from the mold without blemish. It has been found that when the compositions of this invention as described in the preceding examples are used as the release coating on such paper, excellent release characteristics are obtained.

That which is claimed is:

1. A composition consisting essentially of about 1 to 25% by weight of a copolymer composed of $SiO_2$ units and $(CH_3)_3SiO_{1/2}$ units in the ratio of 1:0.4 to 1:1.2 and 75 to 99% by weight of a block copolymer consisting essentially of, by weight, 20 to 80% of an essentially linear portion (A) composed of siloxane units selected from the group consisting of $R(CH_3)SiO$ and $R'SiO_{3/2}$ units wherein R and R' are selected from the group consisting of monovalent hydrocarbon and monovalent halogenated hydrocarbon radicals containing from 1 to 18 carbon atoms, said $R'SiO_{3/2}$ units constituting no more than 50 mole percent of all the siloxane units in (A), said linear portion (A) having a degree of substitution polymerization in the range of 3 to 6000, the rttio of organo groups to silicon atoms in (A) being in the range of 1.5 to 2.0:1, and 20 to 80% of an essentially resinous portion (B) composed of siloxane units selected from the group consisting of $R''(CH_3)SiO$ and $R'''SiO_{3/2}$ units wherein $R''$ and $R'''$ are selected from the group consisting of monovalent hydrocarbon and monovalent halogenated hydrocarbon radicals containing from 1 to 18 carbon atoms, said $R''(CH_3)SiO$ units constituting no more than 40 mole percent of all the siloxane units in (B) nor no more than 50 weight percent of all the siloxane units in (B), and the ratio of organo groups to silicon atoms in (B) being in the range of 1 to 1.4:1, said block copolymer containing residual functional groups selected from the group consisting of hydroxyl groups, alkoxy groups containing from 1 to 6 carbon atoms, acyloxy groups containing from 1 to 6 carbon atoms, and oxime groups containing from 1 to 6 carbon atoms.

2. A composition as defined in claim 1 wherein the block copolymer consists essentially of 50 to 75 percent of (A) and 25 to 50 percent of (B), the ratio of organo groups to silicon atoms in (A) is in the range of 1.9 to 2.0:1, the degree of polymerization of (A) is in the range of 25 to 500, the ratio of organo groups to silicon atoms in (B) is in the range of 1 to 1.1:1, the residual functional groups on the block copolymer are selected from the group consisting of hydroxyl groups, alkoxy groups containing from 1 to 6 carbon atoms, acyloxy groups containing from 1 to 6 carbon atoms, and oxime groups containing from 1 to 6 carbon atoms, and R, R', R'' and R''' are hydrocarbon radicals containing from 1 to 6 carbon atoms.

3. A composition as defined in claim 2 wherein R, R', R'' and R''' are selected from the group consisting of the methyl, ethyl, propyl vinyl and phenyl radicals.

4. A composition as defined in claim 3 wherein the block copolymer consists essentially of about 60% of (A) and about 40% of (B), (A) being composed of $(CH_3)_2SiO$ units and (B) being composed of 5 to 15 mole percent $C_6H_5(CH_3)SiO$ units and 85 to 95 mole percent $C_6H_5SiO_{3/2}$ units, and the functional on the block copolymer are selected from the group consisting of acetoxy and hydroxyl groups.

5. A composition as defined in claim 3 wherein the block copolymer consists essentially of about 60% of (A) and about 40% of (B), (A) being composed of 90 to 99 mole percent $(CH_3)_2SiO$ units and 1 to 10 mole percent $CH_3SiO_{3/2}$ units, (B) being composed of 5 to 15 mole percent $C_6H_5(CH_3)SiO$ units and 85 to 95 mole percent $C_6H_5SiO_{3/2}$ units, and the functional groups on the block copolymer are selected from the group consisting of acetoxy and hydroxyl groups.

6. A composition as defined in claim 3 wherein the block copolymer consists essentially of about 60% of (A) and about 40% of (B), (A) being composed of 90 to 99 mole percent $(CH_3)_2SiO$ units and 1 to 10 mole percent $CH_3SiO_{3/2}$ units, (B) being composed of 65 to 75 mole percent of $C_6H_5SiO_{3/2}$ units and 25 to 35 mole percent of $C_3H_7SiO_{3/2}$ units, and the functional groups on the block copolymer are selected from the group consisting of acetoxy and hydroxyl groups.

7. A method of treating a solid substrate to improve the release of adhesives therefrom said method comprising applying to the substrate the composition of claim 1, and after said composition had been applied to the substrate, curing said composition.

8. The method of claim 7 wherein the block copolymer consists essentially of 50 to 75 percent of (A) and 25 to 50 percent of (B), the ratio of organo groups to silicon atoms in (A) is in the range of 1.9 to 2.0:1, the degree of polymerization of (A) is in the range of 25 to 500, the ratio of organo groups to silicon atoms in (B) is in the range of 1 to 1.1:1, the residual functional groups on the block copolymer are selected from the group consisting of hydroxyl groups, alkoxy groups containing from 1 to 6 carbon atoms, acyloxy groups containing from 1 to 6 carbon atoms, and oxime groups containing from 1 to 6 carbon atoms, and R, R', R'' and R''' are hydrocarbon radicals containing from 1 to 6 carbon atoms.

9. The method of claim 8 wherein R, R', R'' and R''' are selected from the group consisting of the methyl, ethyl, propyl, vinyl and phenyl radicals.

10. The method of claim 9 wherein the residual functional groups on the block copolymer are selected from the group consisting of acetoxy and hydroxyl groups, and trimethyl betahydroxyethyl ammonium 2-ethylhexoate is used as a curing catalyst for the block copolymer.

11. The method of claim 10 wherein the block copolymer consists essentially of about 60% of (A) and about 40% of (B), (A) being composed of $(CH_3)_2SiO$ units and (B) being composed of 5 to 15 mole percent $C_6H_5(CH_3)SiO$ units and 85 to 95 mole percent $C_6H_5SiO_{3/2}$ units, and the functional on the block copolymer are selected from the group consisting of acetoxy and hydroxyl groups.

12. The method of claim 10 wherein the block copolymer consists essentially of about 60% of (A) and about 40% of (B), (A) being composed of 90 to 99 mole percent $(CH_3)_2SiO$ units and 1 to 10 mole percent $CH_3SiO_{3/2}$ units, (B) being composed of 5 to 15 mole percent $C_6H_5(CH_3)SiO$ units and 85 to 95 mole percent $C_6H_5SiO_{3/2}$ units, and the functional groups on the block copolymer are selected from the group consisting of acetoxy and hydroxyl groups.

13. The method of claim 10 wherein the block copolymer consists essentially of about 60% of (A) and about 40% of (B), (A) being composed of 90 to 99 mole percent $(CH_3)_2SiO$ units and 1 to 10 mole percent $CH_3SiO_{3/2}$ units, (B) being composed of 65 to 75 mole percent of $C_6H_5SiO_{3/2}$ units and 25 to 35 mole percent of $C_3H_7SiO_{3/2}$ units, and the functional groups on the block copolymer are selected from the group consisting of acetoxy and hydroxyl groups.

14. A solid substrate having a cured release coating of the composition of claim 1 thereon.

15. The substrate of claim 14 wherein the block copolymer consists essentially of 50 to 75 percent of (A) and 25 to 50 percent of (B), the ratio of organo groups to silicon atoms in (A) is in the range of 1.9 to 2.0:1, the degree of polymerization of (A) is in the range of 25 to 500, the ratio of organo groups to silicon atoms in (B) is in the range of 1 to 1.1:1, and R, R', R'' and R''' are hydrocarbon radicals containing from 1 to 6 carbon atoms.

16. The substrate of claim 15 wherein R, R', R'' and R''' are selected from the group consisting of the methyl, ethyl, propyl, vinyl and phenyl radicals.

17. The substrate of claim 16 wherein the block copolymer consists essentially of about 60% of (A) and about 40% of (B), (A) being composed of $(CH_3)_2SiO$ units and, (B) being composed of 5 to 15 mole percent $C_6H_5(CH_3)SiO$ units and 85 to 95 mole percent $C_6H_5SiO_{3/2}$ units.

18. The substrate of claim 16 wherein the block copolymer consists essentially of about 60% of (A) and about 40% of (B), (A) being composed of 90 to 99 mole percent $(CH_3)_2SiO$ units and 1 to 10 mole percent $CH_3SiO_{3/2}$ units, (B) being composed of 5 to 15 mole percent $C_6H_5(CH_3)SiO$ units and 85 to 95 mole percent $C_6H_5SiO_{3/2}$ units.

19. The substrate of claim 16 wherein the block copolymer consists essentially of about 60% of (A) and about 40% of (B), (A) being composed of 90 to 99 mole percent $(CH_3)_2SiO$ units and 1 to 10 mole percent $CH_2SiO_{3/2}$ units, (B) being composed of 65 to 75 mole percent of $C_6H_5SiO_{3/2}$ units and 25 to 35 mole percent of $C_3H_7SiO_{3/2}$ units.

References Cited
UNITED STATES PATENTS

| | | | |
|---|---|---|---|
| 3,527,659 | 9/1970 | Keil | 260—825 |
| 3,308,203 | 3/1967 | Metevia et al. | 260—825 |
| 3,294,718 | 12/1966 | Antonen | 260—825 |
| 3,328,481 | 6/1967 | Vincent | 260—825 |

WILBERT J. BRIGGS, Sr., Primary Examiner

U.S. Cl. X.R.

117—123 D, 124 F, 132 BS, 138.8 A, 138.8 E, 138.8 F, 143 A, 148, 155 R, 161 ZA; 260—29.2 M, 33.6 SB

UNITED STATES PATENT AND TRADEMARK OFFICE
CERTIFICATE OF CORRECTION

PATENT NO. : 3,819,745
DATED : June 25, 1974
INVENTOR(S) : Floyd A. Plante

It is certified that error appears in the above–identified patent and that said Letters Patent are hereby corrected as shown below:

Column 11, line 15, the word "rttio" should read --ratio--.

Column 12, line 4, the word "had" should read --has--.

Column 13, line 5, the formula "$CH_3SiO_{32/}$" should read --$CH_3SiO_{3/2}$--.

Column 13, line 12, the formula "$CH_2SiO_{3/2}$" should read --$CH_3SiO_{3/2}$--.

Signed and Sealed this

Eighth Day of February 1977

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 3,819,745      Dated June 25, 1974

Inventor(s) Floyd A. Plante

It is certified that error appears in the above-identified patent and that said Letters Patent are hereby corrected as shown below:

Column 11, line 14, "portion (A) having a degree of substitution polymerization" should read -- portion (A) having a degree of polymerization --.

Signed and Sealed this

Twenty-fourth Day of May 1977

[SEAL]

Attest:

RUTH C. MASON
*Attesting Officer*

C. MARSHALL DANN
*Commissioner of Patents and Trademarks*